United States Patent [19]

Bolick, Jr.

[11] 3,860,190

[45] Jan. 14, 1975

[54] WEB STORAGE APPARATUS

[75] Inventor: Fred C. Bolick, Jr., Atlanta, Ga.

[73] Assignee: Lanier Electronic Laboratories, Inc., Atlanta, Ga.

[22] Filed: Oct. 29, 1971

[21] Appl. No.: 193,860

[52] U.S. Cl. .............................. 242/68.5, 206/59 C

[51] Int. Cl. .............................................. B65h 75/00

[58] Field of Search ......... 242/68.5, 118.2, 72, 110, 242/115; 206/49, 50, 51, 63.3, 59 C

[56] References Cited

UNITED STATES PATENTS

| | | | |
|---|---|---|---|
| 2,499,890 | 3/1950 | Themak | 206/63.3 |
| 2,695,139 | 11/1954 | Horvath | 242/68.5 |
| 3,144,934 | 8/1964 | Shultz | 206/50 |

*Primary Examiner*—John W. Huckert
*Assistant Examiner*—Edward J. McCarthy
*Attorney, Agent, or Firm*—Jones, Thomas & Askew

[57] ABSTRACT

Apparatus for storing a quantity of a web such as magnetic recording tape and for transferring such tape to and from a cassette or like container. The apparatus provides a receptacle for receiving a tape cassette and includes a rotary hub onto which a partial or complete quantity of the tape in the cassette can be wound. The tape storage hub can be provided with a removable sleeve onto which the tape is wound, with the sleeve being sufficiently flexible to assume a relatively flattened position when removed from the hub.

12 Claims, 4 Drawing Figures

WEB STORAGE APPARATUS

This invention relates in general to web storage apparatus and in particular to apparatus for withdrawing, storing, and reinserting a quantity of a web material such as magnetic recording tape conventionally stored on a cassette, magazine, cartridge, reel, or the like.

The well-known popularity of magnetic tape recorders has caused these devices to find application in an ever-increasing spectrum of situations where it is desired to make a sound record. This popularity of tape recorders is enhanced by the physically compact recording equipment made possible by developments such as solid-state circuitry and the use of improved tape carrying devices such as cassettes, cartridges, and the like, which permit a tape to be inserted, withdrawn, or exchanged on a particular tape recorder simply by inserting or withdrawing the cassette and without need for threading tape from a supply reel to a takeup reel. The general availability of tape recorders has led to many uses of such machines as a partial or complete substitute for making written notes or memoranda in various situations. For example, persons such as salesmen, accident investigators, and the like can carry a portable recorder with them in the field to dictate a verbal memorandum of sales contacts, the results of an accident investigation, or the like. Although the tape recording thus produced typically is transcribed at a later time to provide a written record of the recorded material, it is frequently desirable to retain the tape recording as permanent, original evidence of the verbal information from which the written memorandum was prepared.

While it is apparent that retention of the tape recording can be accomplished simply by storing the cassette or reel on which the recording is found, this technique is not feasible where a large number of such recordings must be retained and stored for any appreciable length of time. For one thing, the sheer physical volume of tape reels or cassettes which would have to be stored as an incident of accident reports in the insurance business, for example, would require an enormous and economically unfeasible amount of storage space. Moreover, commercially available cassettes or reels of recording tapes commonly contain a quantity of tape sufficient to provide 30 minutes or more of recording time at popular voice recording tape speeds; however, the typical recording of an accident report or a sales contact may take no more than a few minutes or less of actual recording time, and storage of a reel or cassette in such circumstances means a substantial portion of the available recording time on the cassette has been wasted as a result of storing the desired recorded material.

While it is possible to unwind the recorded portion of the tape from the cassette or reel for storage separate from the reel, a loose quantity of magnetic recording tape is difficult to store without becoming subject to being damaged by tearing or crumpling. Moreover, it becomes tedious and time-consuming for a person to painstakingly unreel the tape from a hand-held cassette or reel and then snip off the desired portion of the tape in an efficient manner and without causing the tape to become entangled in itself or in adjacent objects.

Accordingly, it is an object of the present invention to provide an improved web storage apparatus.

It is another object of the present invention to provide a web handling and storage apparatus for use with magnetic recording tape.

It is a further object of the present invention to provide web handling and storage apparatus which permits a quantity of a web material to be readily withdrawn from a web storage container.

It is still another object of the present invention to provide web handling and storage apparatus including a web receiving article which is compact and readily storable.

It is a further object of the present invention to provide a web receiving article which is compact and readily storable.

Other objects and many of the attendant advantages will become more readily apparent from the following description of an embodiment of the present invention, including the drawing in which.

Stated generally, the present invention includes a receptacle for receiving a web storage container and including a drive shaft which may be manually and/or power driven to impart winding motion to the reel of the tape storage container. A rotary member which is preferably in the shape of a hub or wheel is positioned to be adjacent the web container receptacle, so that a quantity of web in the container can be conveniently wound around the periphery of the hub. A web receiving article is provided which can be slipped over the hub so that a quantity of web from the web container can be wound thereon; the web receiving article can then be slipped off the hub to assume a relatively flat position for ease of storage.

Figure 1:
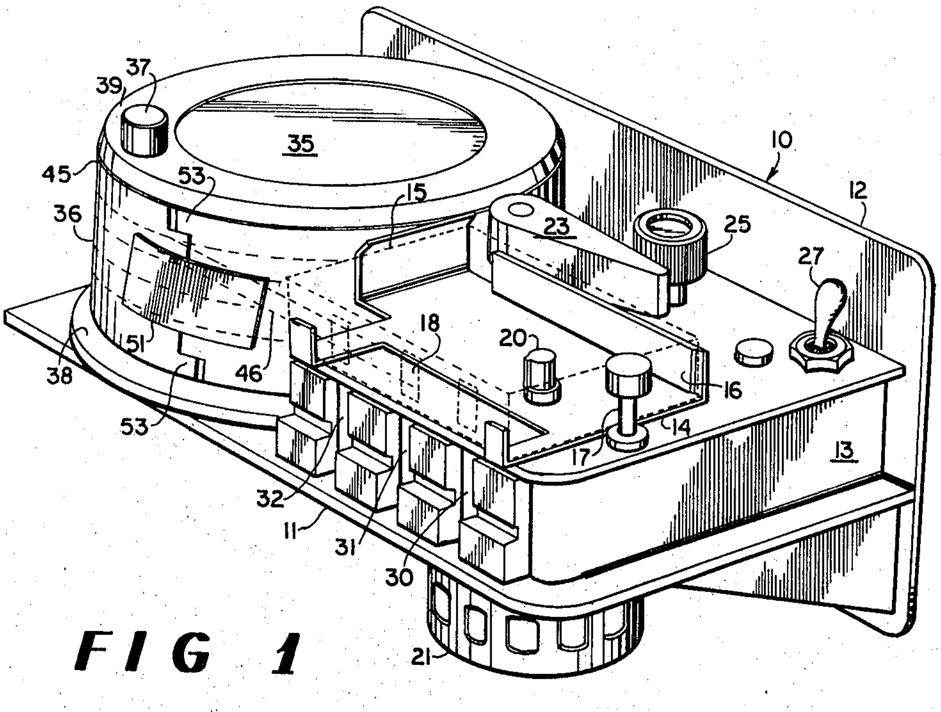
FIG. 1 is an isometric overall view of an embodiment of the present apparatus.

Stated more particularly and with reference taken to FIG. 1, there is shown an embodiment of the present invention including a web handling and storage apparatus indicated generally at 10 and having a support member 11 upstanding from a base member 12. A drive housing 13 is mounted on the left side of the support member 11 and includes a receptacle 14 which may be configured to receive a particular kind of web container such as, for example, a conventional tape cassette 15 shown in phantom in FIG. 1. The receptacle 14 may include a base member 16 and a lateral support 17 for accurate positioning of the cassette in the receptacle.

Figure 2:
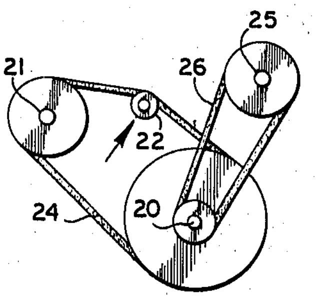
FIG. 2 is a semi-schematic view of a drive train for use in the embodiment of FIG. 1.

A drive shaft 20 extends from within the drive housing 13 for engagement with a tape reel of the cassette 15. The drive shaft 20 is operatively coupled to a suitable source of motive power such as a motor 21 through a variable speed drive which may comprise a clutch as shown in FIG. 2 and including a movable idler pulley 22 which is selectively positionable at the control of lever 23 to vary the tension in the drive belt 24 which interconnects a driving pulley connected to be rotated by the shaft of the motor 21 and a driven pulley connected for rotating the drive shaft 20. The drive shaft 20 can be manually rotated independently of the motor 21 through a control wheel 25 which is operatively coupled to the drive shaft 20 by way of the second belt 26. The provision of separate powered drive and manual drive for the drive shaft 20 permits relatively rapid, yet variable, traverse of the tape under the control of the idler pulley lever 23, and also permits precise final positioning of the tape by manipulation of the control wheel 25. A motor control switch 27 may be provided on the drive housing of the apparatus.

A number of slots 30, 31, and 32 are provided along the upper surface of the drive housing 13, with such slots being generally aligned to coincide with the tape access openings found along the front wall of a conventional tape cassette, the purpose of such slots being pointed out hereinbelow.

A tape winding hub 35, which may have a peripheral surface 36 substantially greater in width than the width of the recording tape or other web material to be wound thereon, is mounted for rotation on the support member 11 alongside the drive housing 13. The hub 35 may have a front-mounted knob 37 disposed to permit the wheel to be manually rotated, although it will be apparent to those skilled in the art that the hub 35 can be coupled to a suitable source of motive power for rotation.

The hub 35 is provided with an annular flange 38 which adjoins the peripheral surface 36 along that side of the peripheral surface which is adjacent the support member 11. The front side 39 of the peripheral surface preferably contains no flange or other projections extending radially outwardly from the peripheral surface 36.

Figure 3:
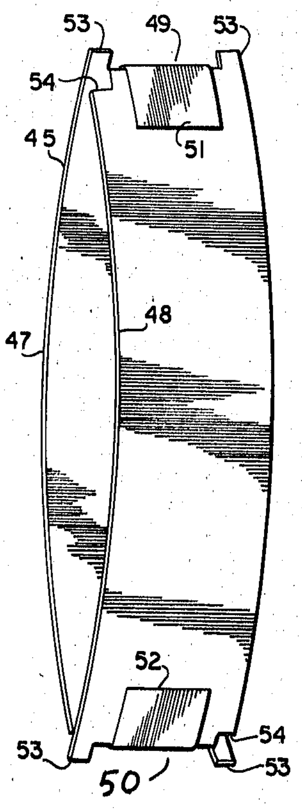
FIG. 3 is a pictorial view of a web storage article according to an embodiment of the present invention, and as partially bowed open.
Figure 4:
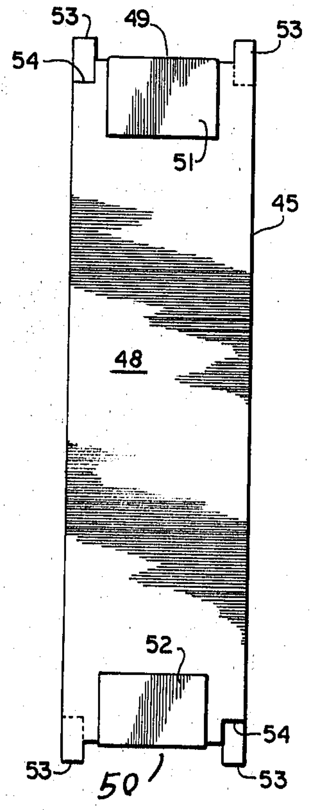
FIG. 4 shows an elevation view of the front side of the web storage article of FIG. 3.

A tape storage device 45 may be removably disposed over the peripheral surface of the hub 35, so that the peripheral surface onto which the tape 46 (shown in phantom) is wound is actually the peripheral surface of the tape storage device 45. As best shown in FIGS. 3 and 4, the tape storage device 45 includes a first side member 47 and a second side member 48 of substantially equal length. The first and second side members 47 and 48, which may be made of a relatively thin material such as a plastic sheet or the like which normally assumes a flat configuration but which can be substantially deformed from its normal position without becoming broken or permanently deformed, are positioned adjacent one another and are joined together at the adjacent ends 49 and 50 by a suitable flexible member, such as by respective lengths 51 and 52 of tape which are adhesively secured to the outer surfaces of the first and second side members. At each of the ends of the side members as thus interconnected, each side member has a projection 53, which extends a distance beyond the nominal end of the side member, and a recess 54 on the opposite side of the side member, which similarly extends a distance along the length of the side member and inwardly of the nominal end thereof. It can be seen that the side members 47 and 48 are interconnected adjacent each other so that each of the projections 53 of one side member is disposed opposite a recess 54 of the other side member.

Referring once again to FIG. 1, it can be seen that the lengths of the first and second side members 47 and 48 in the disclosed embodiment have been chosen so that when the tape storage device 45 is bowed to form substantially a circle, the bowed tape storage device can be slidably disposed over the front side 39 of the tape winding hub 35 to be received thereon substantially in the form of an annulus on the peripheral surface 36 of the hub. The aforementioned juxtaposition of projections 53 and recesses 54 enables each projection to fit within an adjacent recess, thus insuring that the tape storage device 45 as received on the reel 35 provides a substantially circular tape winding surface.

Considering the operation of the disclosed embodiment of the present invention, assume that a tape cassette 15 contains a quantity of dictated tape which is desired to be stored. The cassette is mounted in the receptacle 14 and a tape storage device 45 is disposed on the hub 35. It is assumed that the position of the tape in the cassette 15 remains undisturbed from the conclusion of dictation, so that the tape contained on the cassette takeup reel, that is, the reel which is engaged by the drive shaft 20, contains only that tape which is to be removed from the cassette for retention. The operator of the apparatus inserts a pointed object, such as a pencil or the like, beneath the tape as exposed in one of the cassette openings 18, for example, with the slot 31 positioned behind the cassette opening permitting the pointed object to extend completely beneath the tape. The pointed object then is lifted to withdraw a short quantity of dictated tape from the cassette takeup reel, the cassette supply reel being hand-held or otherwise snubbed as necessary to prevent its rotation, and the tape thus withdrawn from the cassette can be severed by scissors or another appropriate device. The loose tape end extending from the cassette takeup reel net is manually further withdrawn from the cassette and is attached to the outer surface of the tape storage device 45 by means of adhesive tape or any other suitable securing medium. The hub 35 now is rotated in a clockwise direction (as seen in FIG. 1) to withdraw the desired amount of tape from the takeup reel of the cassette 15. In practice, it may be desirable to leave a length of leader material, or recording tape marked as leader and not used for recording, permanently connected to the takeup reel of the cassette.

When all of the desired dictated tape has been withdrawn from the cassette, this tape is severed (for example at its point of connection with the aforementioned tape leader) and any unrecorded tape which may be on the supply reel of the cassette can be connected to the leader so that the cassette can be withdrawn from the present apparatus and returned to a dictator for further use as a supply of fresh tape. The loose end of tape extending to the tape storage device 45 can be adhesively taped or otherwise secured thereto, and the tape storage device can now be removed from the hub 35 by sliding over the front side 39 thereof. Once the tape storage device 45 has been thus removed from the hub 35, the natural tendency of the resilient material from which the side members 47 and 48 are formed causes the tape storage device 45 to become unbowed to assume a substantially flat position as shown in FIG. 4. At this time, the projections 53 extend outwardly of the nominal length of the side members to retain the tape wound thereon in place and to prevent such tape from becoming dislodged or spilling over the ends of the tape storage device. The tape storage device 45, which is now a generally flat article having only the thicknesses of the two side members, may be readily filed in a conventional file folder or the like to occupy only a small fraction of the filling space which would otherwise be occupied by attempted storage of a cassette 15.

If it is desired to record from a length of tape which has been previously stored on a tape storage device 45, the foregoing procedure is readily reversed by placing a tape-containing storage device 45 on the hub 35 and by inserting in the receptacle 14 either a tape reel or a cassette having a leader extending from the takeup reel thereof. The outermost end of the tape contained on the tape storage device simply is connected to the leader of the cassette, and the drive shaft 20 is energized through operation of the motor 21 and the clutch lever 23 (or optionally through the control wheel 25) to withdraw the tape from the storage device 45 onto the cassette takeup reel. When the tape is thus withdrawn from the storage device 45, the remaining exposed end of such tape can, if desired, be secured to a cassette supply reel leader, thus to be rewound in the cassette for subsequent playback.

It will be apparent to those skilled in the art that the present invention is not limited to use with magnetic recording tape and can be used as well to store lengths of other web material. For example, the present invention and especially the tape storage device 45 thereof is well suited to receive and store length of perforated paper tape of the type frequently used in conjunction with automatic typewriters or the like. Moreover, it will be understood that the drive arrangement depicted in FIG. 2 is by way of example only and that other interconnecting arrangements between the motor 21 and the drive shaft 20, as well as other clutch or variable speed devices, can be employed herein.

It will be additionally understood that the foregoing relates only to an embodiment of the present invention, and that numerous alterations and modifications may be made therein without departing from the spirit and the scope of the present invention.

What is claimed is:

1. Apparatus for receiving a length of a flexible web material, comprising:

web holding means defining a web supporting surface;

said web holding means being normally resiliently operative to assume a first configuration wherein said web holding means is substantially flat and being elastically deformable to assume a second configuration wherein said web holding means is substantially nonflat; and said web supporting surface has a predetermined length which remains substantially unchanged whether said web holding means assumes said flat or said nonflat configuration.

2. Apparatus as in claim 1, wherein:

said web holding means is selectively deformably configurable to assume an arcuate configuration in said nonflat configuration.

3. Apparatus as in claim 1, wherein:

said web supporting surface defines a web receiving area having a length dimension along which a length of web is receivable and having a width dimension substantially greater than the width of such web.

4. Apparatus for receiving a length of a flexible web material, comprising:

web holding means defining a web supporting surface;

said web holding means being selectively configurable to assume a first configuration wherein said web holding means is substantially flat and to assume a second configuration wherein said web holding means is substantially nonflat said web holding means includes a plurality of web receiving members each of which has a web receiving surface extending between a first end and a second end thereof; and means joining together said web receiving members with said first and second ends connected in end-to-end relationship so that said web receiving surfaces of said plurality of web receiving members comprise said web supporting surface.

5. Apparatus as in claim 4, wherein:

said plurality of web receiving members comprises a pair of web receiving members;

means flexibly interconnecting the first ends of said pair of web receiving members;

means flexibly interconnecting the second ends of said pair of web receiving members; and each of said web receiving members being sufficiently flexible to enable the interconnected members to be selectively movable between said first position in which such members are disposed adjacent each other and a second position in which such members are disposed outwardly from each other intermediate said interconnected ends.

6. Apparatus as in claim 5, wherein:

each of said web receiving members comprises an elongated flexible strip, the width of each such strip comprising the width of said web receiving surface and being at least as wide as the width of a web to be received thereon.

7. Apparatus as in claim 6, further comprising:

web retaining means operatively interrelated with said interconnected members to retain in place a quantity of web disposed on the length of said members.

8. Apparatus as in claim 6 wherein:

each of said web receiving members is of substantially the same length.

9. Apparatus as in claim 8, wherein:

each of said web receiving members is substantially planar so that the interconnected members naturally tend to assume said first position in which said members are disposed adjacent each other.

10. Apparatus as in claim 4, wherein:

each of said web receiving members comprises a substantially rectangular flexible sheet;

each of said flexible sheets having a first projection extending from a first corner of one end of the sheet a fixed distance along the dimension of length of the sheet;

each of said flexible sheets having a first recess extending inwardly from a second corner of said one end of the sheet at least said fixed distance along the dimension of length of the sheet;

said pair of sheets being interconnected to place said projection of each sheet into confronting juxtaposition with said recess of the other sheet.

11. Apparatus for receiving and retaining a length of a flexible web material, comprising:

a closed loop substantially the entire length of which is an elastically deformable flat sheet material having an outer surface defining a web receiving surface and having an interior surface, and a pair of flexible interconnecting means interposed in said closed loop to divide said closed loop into two substantially equal lengths which normally assume a flat configuration placing the flat interior surface of one length substantially in contact with the flat interior surface of the other length.

12. Apparatus as in claim 11, wherein:

at least one of said lengths includes a projection extending outwardly from one of said dividing locations to retain a length of flexible web disposed on said web receiving surface when in said normal flat configuration; and said other length has a recess extending inwardly from said one dividing location to receive said projection when said closed loop is deformed out of said normal flat configuration.

* * * * *